United States Patent
Baker

(10) Patent No.: US 6,378,834 B1
(45) Date of Patent: Apr. 30, 2002

(54) SHAFT SUPPORTING HUB RING WITH INTEGRAL SELF-LOCKING MECHANISM

(75) Inventor: Gerald N. Baker, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/500,748

(22) Filed: Feb. 9, 2000

(51) Int. Cl.[7] .................................................. F16M 1/00
(52) U.S. Cl. ...................................................... 248/674
(58) Field of Search ................................ 248/674, 314; 310/91

(56) References Cited

U.S. PATENT DOCUMENTS

| 2,047,838 A | 7/1936 | Smith et al. |
| 2,982,504 A | 5/1961 | Feiertag et al. |
| 3,107,946 A | 10/1963 | Drake |
| 3,143,284 A | 8/1964 | Lindsjo et al. |
| 3,235,653 A | 2/1966 | Ostrognai |
| 3,285,547 A | 11/1966 | Henry |
| 3,394,908 A | 7/1968 | Irvin |
| 3,509,393 A * | 4/1970 | Roddy .......................... 310/51 |
| 3,617,784 A | 11/1971 | Lindgren |
| 3,983,429 A | 9/1976 | Allardice, Jr. |
| 4,282,566 A | 8/1981 | Newman |
| 4,742,256 A | 5/1988 | Tanaka et al. |
| 4,758,101 A | 7/1988 | Roof, Sr. et al. |
| 4,921,229 A | 5/1990 | Hori |
| 5,203,093 A | 4/1993 | Baker |

FOREIGN PATENT DOCUMENTS

GB    2184611 A  *  6/1987

* cited by examiner

Primary Examiner—Ramon O. Ramirez
(74) Attorney, Agent, or Firm—Thompson Coburn LLP

(57) ABSTRACT

A hub ring employed in mounting a rotating shaft of an electrical device, for example an electric motor, to a supporting bracket reduces or eliminates the transmission of vibration from the shaft to the supporting bracket and is provided with an integral locking mechanism that automatically secures the hub ring to the supporting bracket when the hub ring is positioned on the bracket without the need for separate attachment parts and/or fasteners.

17 Claims, 4 Drawing Sheets

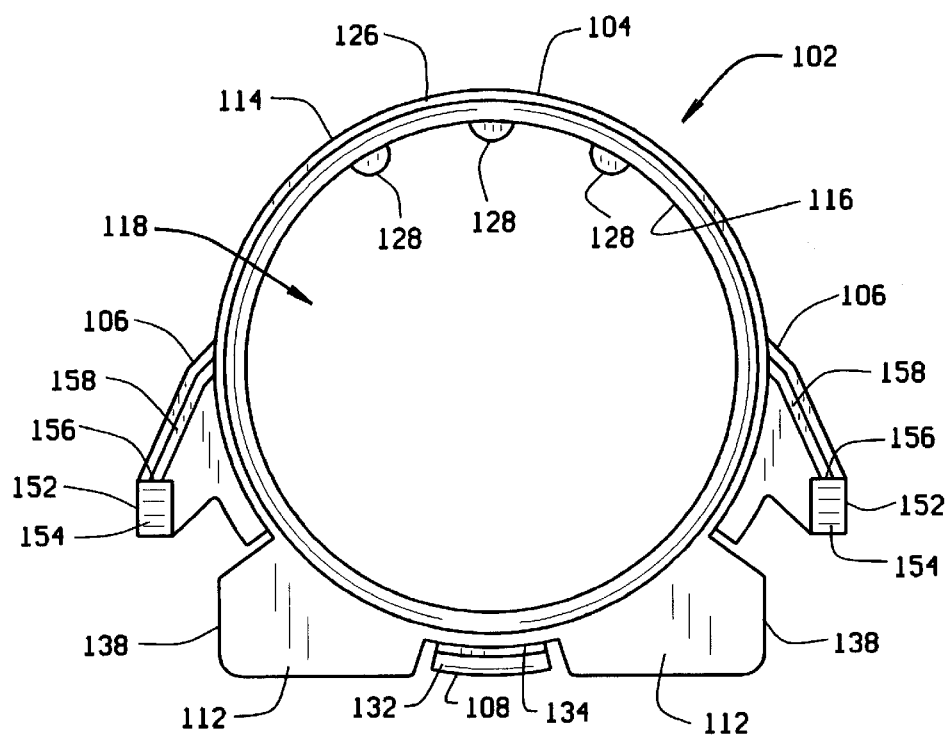
FIG. 6
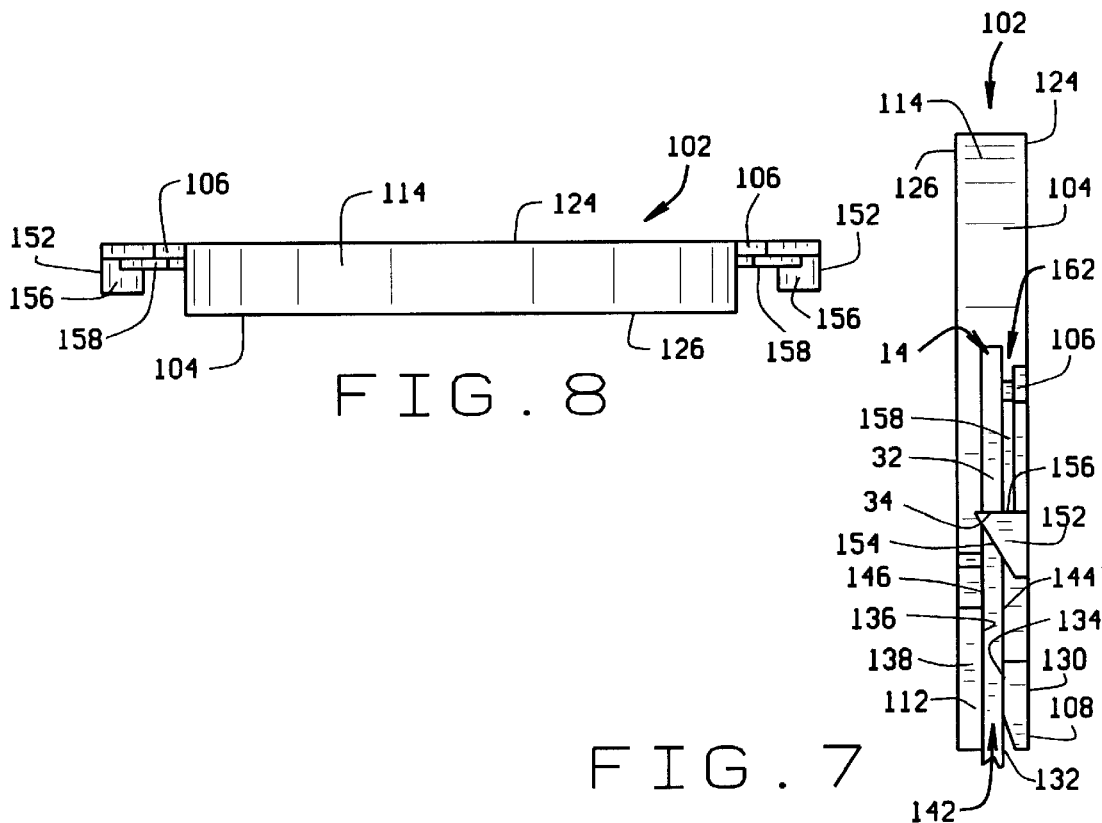
FIG. 8
FIG. 7

SHAFT SUPPORTING HUB RING WITH INTEGRAL SELF-LOCKING MECHANISM

BACKGROUND OF THE INVENTION (1) Field of the Invention

The present invention pertains to a hub ring employed in mounting a rotating shaft of an electrical device, for example an electric motor, to a supporting bracket. In particular, the present invention pertains to a hub ring that reduces or eliminates the transmission of vibration from the shaft to the supporting bracket and is provided with an integral locking mechanism that automatically secures the hub ring to the supporting bracket when the hub ring is positioned on the bracket without the need for separate attachment parts and/or fasteners.

(2) Description of the Related Art

Hub rings have long been employed in the prior art in mounting electrical devices such as electric motors to supporting brackets. Vibration damping hub rings are generally comprised of an inner, annular damper constructed of a resilient material such as rubber and an outer, annular ring constructed of a more rigid material such as plastic or metal. Hub rings are usually employed in pairs with the annular dampers of the hub rings being mounted over bearings or bushings mounted on the opposite ends of the motor shaft and the outer rigid rings of the hub rings being mounted on support brackets.

FIG. 1 shows one example of a prior art hub ring 12 mounted on a support bracket 14. The support bracket 14 is one of a pair of support brackets 14, 16 that support an electric motor 18 by supporting opposite ends of the motor shaft 22. In the example shown, each support bracket 14, 16 is constructed from a flat piece of metal that is stamped or in some other equivalent manner formed with a base portion 24 and an arm portion 26. As shown in FIG. 1, the arm portion 26 of each bracket is bent at a right angle relative to the base portion 24. When the base portion of each bracket is attached to a support surface, for example that of an electric appliance, each arm portion positions an arcuate support surface 28 of each arm at a vertical height above the base portion that is sufficient to support the electric motor 18 above each base portion. Although only one support surface 28 of the two bracket arms 26 is visible in FIG. 1, they are both configured in the same manner. At the opposite ends of the support surface 28 each arm is formed with a pair of outwardly projecting catches 32. Each of the catches 32 has a latch surface 34 on its underside.

The support brackets 14 shown in FIG. 1 are only one example of support brackets that have been employed in supporting electrical devices such as motors. There are many other types of support brackets that are used for the same purpose, however most have the common features of an arcuate support surface and a pair of latch surfaces at opposite ends of the support surface.

The support surface 28 of the bracket 14 to the right in FIG. 1 is shown supporting a prior art hub ring 12 attached to the bracket. FIG. 2 shows the prior art hub ring 12 removed from the support bracket. The hub ring 12 is basically comprised of an outer annular ring 36 constructed of metal, plastic or other similar rigid material and an inner annular damper 38 constructed of rubber or other similar resilient material. The outer ring 36 has a cylindrical peripheral surface with an annular groove 42 formed into the surface forming a pair of annular rims 44 at axially opposite sides of the groove. The groove 42 has an axial dimension or width that is sized to receive the support surface 28 of the bracket in a tight fit, preventing any axial movement of the hub ring 12 relative to the bracket 14 when the hub ring is mounted on the bracket. The annular damper 38 is molded, glued or secured to the interior surface of the outer ring 36 in some other equivalent manner. In the embodiment of the hub ring shown in FIG. 2, the damper is formed with four radially inwardly projecting surfaces 46 that are dimensioned to fit in tight friction engagement around the exterior of a bearing or bushing mounted on the shaft 22 of the motor 18. Alternatively, the interior surface 48 of the damper could be dimensioned to fit in tight friction engagement around the bearing or bushing supporting the motor shaft 22.

Referring back to FIG. 1, the prior art hub ring 12 is shown mounted on the right side support bracket 14 with the damper 38 engaging around a bearing 52 mounted on the motor shaft 22. The hub ring 12 is positioned on the support bracket 14 with the support surface 28 of the bracket engaging in the annular groove 42 of the ring. In the example shown in FIG. 1, the hub ring 12 is securely held on the bracket support surface 28 by a pair of curved straps 54 constructed of a rigid material such as metal, plastic or other similar rigid material. Each of the straps are the same and are formed with an elongated slot 56 adjacent one end and a fastener hole 58 adjacent the opposite end. In securing the hub ring 12 to the support bracket 14, the straps 54 are positioned on the bracket as shown to the right in FIG. 1 with the pair of arm catches 32 extending through the slots 56 of the brackets and with the fastener holes 58 of the brackets aligned at the top of the hub ring 12. A screw 62 and nut 64 fastener is then attached through the aligned holes 58 of the straps and is tightened down, thereby securing the hub ring 12 to the support bracket 14. This attachment process is repeated for a hub ring mounted on the motor shaft 22 at the opposite end or left hand end of the motor shown in FIG. 1.

FIG. 3 shows a variation in the prior art mechanism for attaching a hub ring to a support bracket where the pair of curved straps are replaced by a single strap 66 having an inverted U-shape. The single strap 66 is constructed of metal, plastic or other similar resilient material. It is formed with a pair of elongated slots 68 adjacent its opposite distal ends and with a U-shaped bend 72 at its center. The center U-shaped bend 72 gives the single strap a resiliency in addition to the resiliency of the material from which the strap is constructed. In securing the hub ring 12 to a support bracket 14 employing the single strap 66, one of the elongated slots 68 is first attached over one of the arm catches 32 of the support bracket and the strap 66 is stretched over the top of the hub ring 12. Stretching the strap 66 causes the U-shaped bend 72 to open slightly enabling the elongated slot 68 on the opposite end of the strap to pass over the other arm catch 32 and engage with the latch surface 34 of the catch, thereby attaching the single strap 66 onto the support bracket securing the hub ring to the support bracket. In a variation of this attaching mechanism, a screw and nut fastener 74 can be provided through the U-shaped bend 72. The fastener 74 can be tightened down to constrict the single strap 66 over the top of the hub ring 12 to further secure the hub ring to the support bracket 14.

FIG. 4 shows a still further variation of a hub ring 76 that is similar to the previously described prior art hub rings except that it is provided with an integral attachment mechanism. The hub ring shown in FIG. 4 is usually constructed of resilient plastic and includes a center ring 78 dimensioned to fit in tight friction engagement around a bearing or bushing 82 mounted on the motor shaft 84. An outer ring 86 surrounds the center ring 78 and is connected to the center ring by a plurality of curved, resilient spring members 88.

The hub ring 76 is held to the support bracket 14 by integrally formed flexible attaching straps 92 that have slotted openings (not shown) near their distal ends. The attaching straps 92 are shown in their operative position in FIG. 4 securing the hub ring 76 to the support bracket 14. In at rest or free positions of the attaching straps 92 the resiliency of the straps moves them to positions that are spaced radially outward from the arm catches 32 of the support bracket. In attaching the hub ring 76 to the support bracket 14, the hub ring is first positioned on the support surface 28 of the bracket and one of the straps 92 is positioned over one arm catch 32 with the one strap engaging the latch surface 34 of the arm catch. The hub ring 76 is then rotated slightly causing the engaged strap 92 to stretch and the free strap 92 is stretched until its elongated slot (not shown) can be passed over the opposite arm catch 32 of the support bracket engaging the free strap with the opposite latch surface 34.

The prior art hub ring attachment mechanisms described above are disadvantaged in that they are difficult to secure to the support bracket 14. The hub ring shown in FIG. 1 is attached by first positioning the hub ring on the support bracket 14 and then holding the two curved straps 54 over the opposite sides of the hub ring while the bolt 62 is inserted through the aligned holes 58 of the straps. The nut 64 is then threaded on the bolt 62 and tightened down to secure the hub ring 12 to the support bracket. Thus, the attachment mechanism shown in FIG. 1 has the drawback of having multiple parts which makes the installation and removal of the attachment mechanism difficult and time consuming, especially in environments having limited space, for example in the interior of a household appliance.

Despite the benefits over the multiple part attachment mechanism of FIG. 1, the inverted U-shaped strap 66 attachment mechanism of FIG. 3 is still separate from the hub ring 12, thereby still requiring its own installation time. If the fastener 74 is used to further secure the single strap 66 to the support bracket 14 the installation and removal of the strap is made more difficult and time consuming, especially in environments having limited space.

The integral attachment mechanism or straps 92 of the hub ring 76 of FIG. 4 eliminate some of the problems associated with using separate attachment mechanisms from the hub ring, however its attachment to the support bracket 14 is still difficult. Each strap 92 must be stretched during installation and removal, thus requiring more time. In addition, because the straps 92 flex away from the hub ring in their at rest or free positions, one strap must be held over one arm catch 32 while the other strap is stretched and positioned over the opposite arm catch making installation difficult.

What is needed to overcome the disadvantages of prior art hub ring attachment mechanisms is a hub ring attachment mechanism that does not require separate component parts and is automatically attached to the support bracket as the hub ring is positioned on the support bracket

SUMMARY OF THE INVENTION

The hub ring of the present invention overcomes disadvantages associated with prior art hub rings by providing a hub ring with an integral locking mechanism. The integral locking mechanism automatically locks the hub ring on the support bracket when it is properly positioned on the support surface of the support bracket. There is no need for additional attachment parts, fasteners or tools. In addition, the hub ring of the invention can be easily removed from its attachment to the support bracket by using only a prying tool, for example a small flat tip screwdriver. In the preferred embodiment of the invention the hub ring and its integral locking mechanism are constructed of a rigid but resilient plastic, thereby reducing its cost of manufacture. The hub ring of the invention is basically comprised of an annular ring having a pair of resilient, flexible arms and having three flanges that project radially outwardly from the ring where the ring, arms and flanges are all formed as a single monolithic piece.

The annular ring has a cylindrical exterior surface and an interior surface that surrounds a center opening of the ring. The exterior surface of the ring has an axial width between first and second circular end faces of the ring. A resilient vibration damper of the types employed in prior art hub rings is molded or otherwise secured to the interior surface of the ring.

A center positioning flange of the plurality of flanges extends radially outwardly from the exterior surface of the ring adjacent the ring first end face. A pair of side positioning flanges of the plurality of flanges project radially outwardly from the exterior surface of the ring adjacent the second end face of the ring. The center flange and the pair of side positioning flanges are spaced axially from each other forming a gap between the flanges at the bottom of the ring exterior surface. The gap is dimensioned sufficiently wide to receive the support bracket in the gap with the support surface of the bracket engaging the bottom of the ring exterior surface. The plurality of flanges engage against opposite first and second surfaces of the bracket on opposite sides of the bracket support surface, thereby securely positioning the hub ring on the support surface of the bracket.

The pair of resilient, flexible arms project radially outwardly from the exterior surface of the ring adjacent the first end face of the ring. The pair of arms are positioned on the ring exterior surface slightly above the pair of side positioning flanges. The arms make up a part of the locking mechanism of the hub ring. The resilient flexibility of the arms enables them to flex axially between first and second positions of the arms relative to the ring. Each arm projects radially from the ring exterior surface to a distal end of the arm and each arm has a wedge shaped barb at its distal end. Each barb has a cam surface that slides along a side of the support bracket when the hub ring is moved toward the support surface of the bracket causing the resilient arm of each locking mechanism to resiliently flex from a first, at rest position of the arm relative to the ring to a second, axially displaced position of each arm relative to the ring. Each barb also has a locking surface that passes over and engages against the latch surface of each arm catch of the support bracket when the hub ring is positioned with its exterior surface on the support surface of the support bracket. When the locking surface of the barb passes over the latch surface of the support bracket the resiliency of each arm causes each arm to flex from its second axially displaced position relative to the ring back to its first position relative to the ring, thereby positioning the locking surface of each barb beneath the latch surface of the support bracket catch arms automatically locking the hub ring to the support bracket. Each arm of the locking mechanisms is provided with a rib extending across a surface of the arm adjacent the barb. The rib engages against a side surface of the support bracket with the hub ring attached to the support bracket and maintains a small spacing between each resilient arm and the surface of the support bracket engaged by the rib. The spacing is sufficient to enable insertion of a prying tool between the resilient arm and the support bracket where the prying tool can be used to flex the arm from its first position to its second position relative to the ring, thereby enabling the ring to be removed from the support bracket.

BRIEF DESCRIPTION OF THE DRAWINGS

Further objects and features of the present invention are revealed in the following detailed description of the preferred embodiment of the invention and in the drawing figures wherein

FIG. 6 is an end elevation view of the hub ring of FIG. 5;

FIG. 7 is a side elevation view of the hub ring of FIG. 5 and a portion of a support bracket to which the hub ring is secure; and FIG. 8 is a top plan view of the hub ring of FIG. 5.

DETAILED DESCRIPTION OF THE INVENTION

FIGS. 5 through 8 show the hub ring 102 of the invention with its integral locking mechanism. In the preferred embodiment of the invention the hub ring and its integral locking mechanism are constructed of a rigid but resilient plastic, thereby reducing its manufacturing cost. The hub ring 102 is basically comprised of an annular ring 104 having a pair of resilient, flexible arms 106 and having three flanges 108, 112 that project radially outwardly from the ring with the ring 104, arms, 106 and flanges 108, 112 all being formed as a single monolithic piece.

Figure 1:
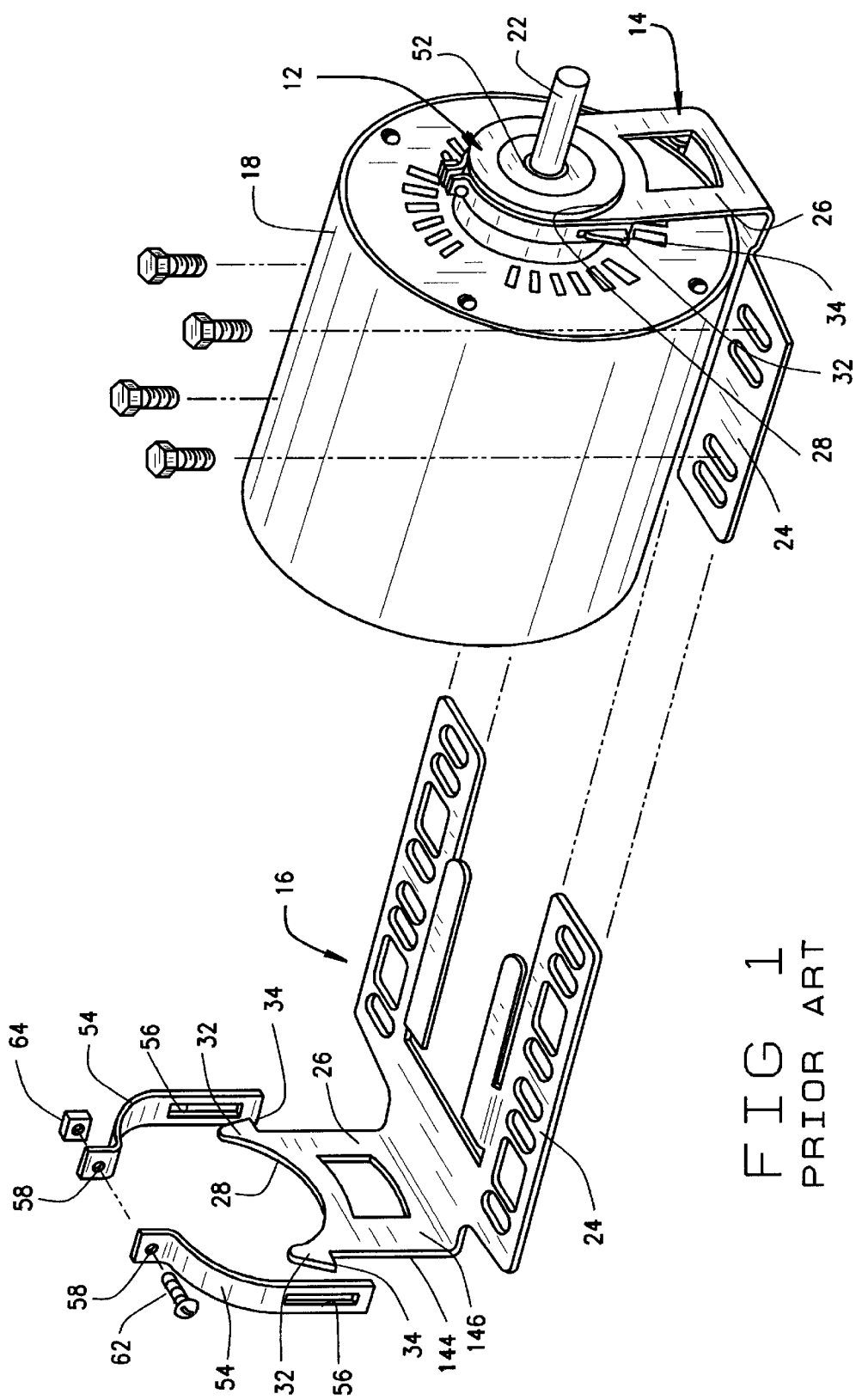
FIG. 1 shows a pair of prior art support brackets, a pair of prior art curved attachment straps and an electric motor mounted by a prior art hub ring to one of the support brackets by a pair of attachment straps.
Figure 2:
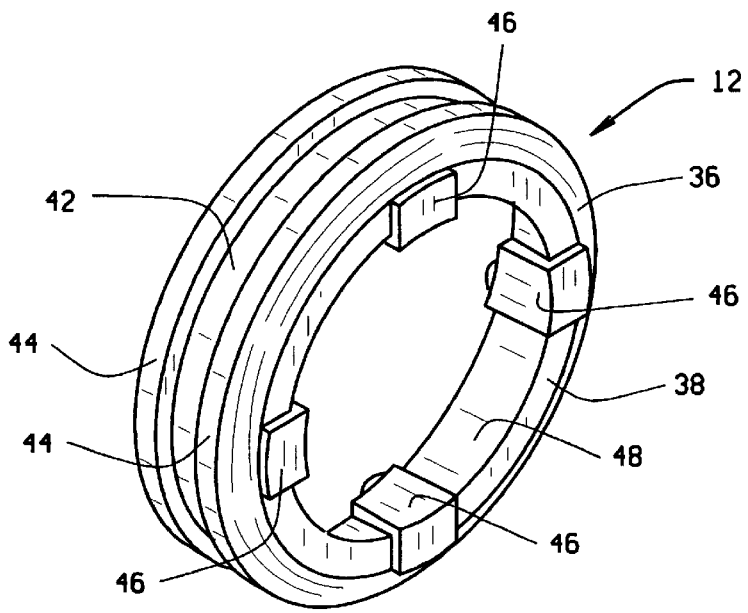
FIG. 2 shows the prior art hub ring of FIG. 1 removed from the support bracket.
Figure 3:
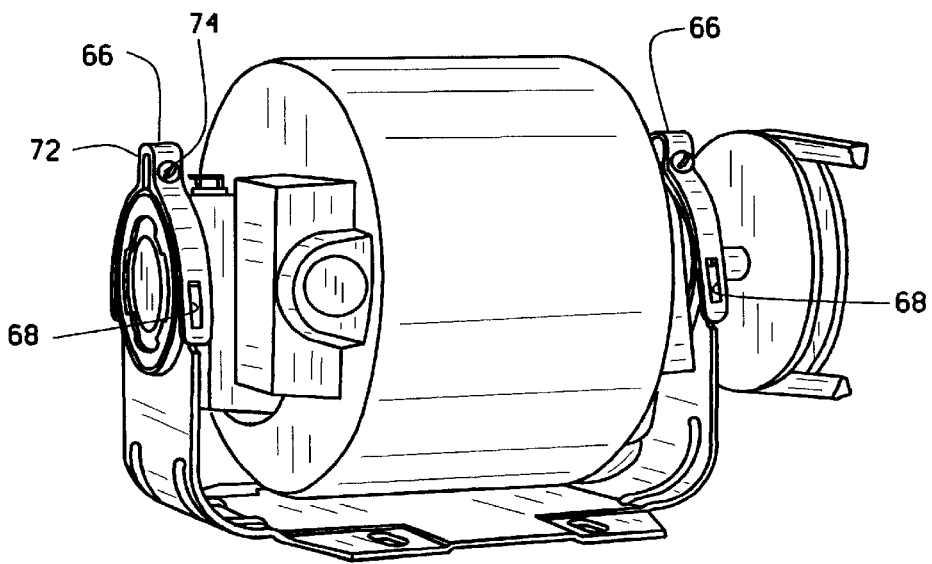
FIG. 3 shows prior art single strap hub ring attachment mechanisms.
Figure 4:
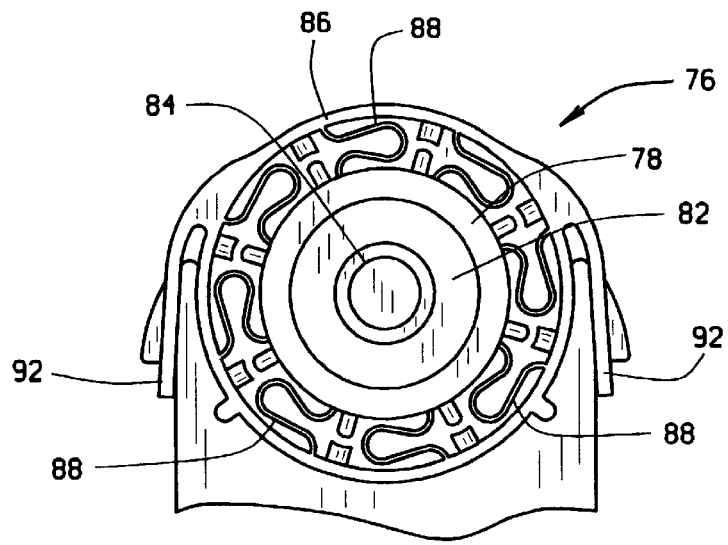
FIG. 4 shows a further embodiment of a prior art hub ring attachment mechanism.
Figure 5:
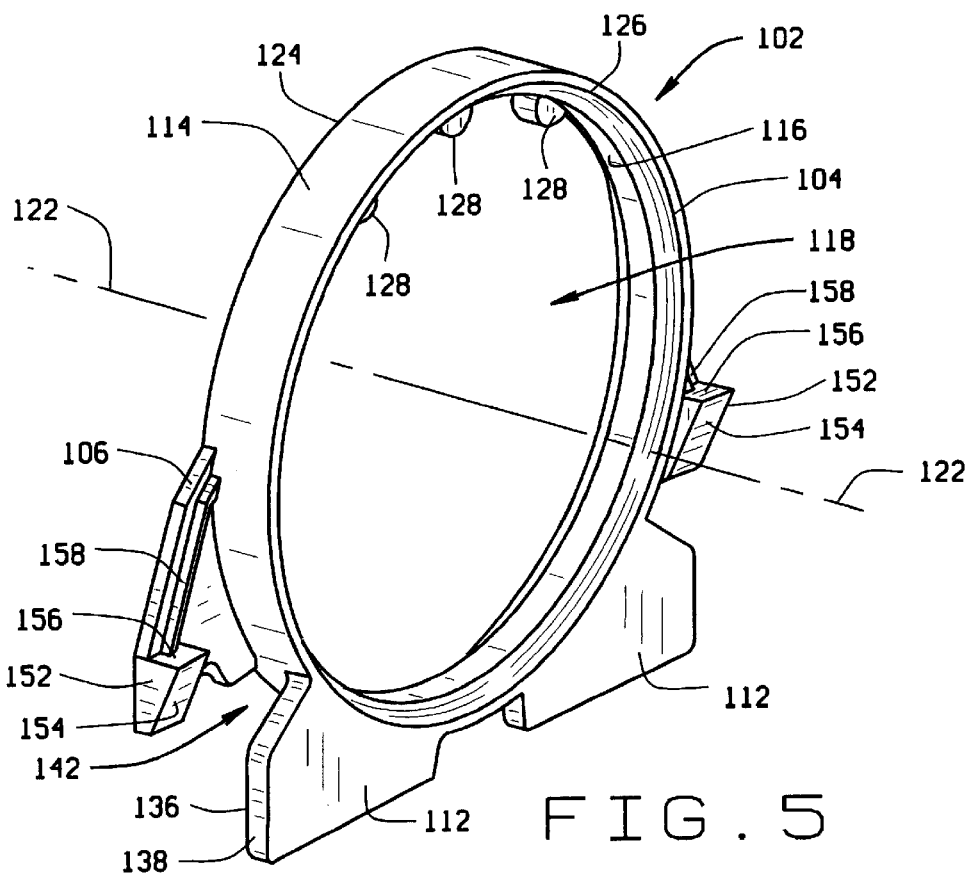
FIG. 5 is a perspective view of the hub ring of the invention.

The annular ring 104 has a cylindrical exterior surface 114 and an interior surface 116 that surrounds a center opening 118 of the ring having a center axis 122. The ring 104 is shown in FIGS. 5 through 8 with its vibration damper removed to show the details of the interior or the ring. The exterior surface 114 of the ring has an axial width between a first circular end face 124 of the ring and a second circular end face 126 of the ring. Referring to FIG. 5, the interior surface 116 of the ring has an axial width that is smaller than that of the exterior surface 114. This gives the ring a cross-section having a general trapezoidal configuration. The interior surface of the ring is also provided with a plurality of protrusions 128 that project radially inwardly from the ring interior surface adjacent the top of the ring. A resilient vibration damper (not shown) of the types employed in prior art hub rings discussed earlier is molded or otherwise secured to the ring interior surface 116. The vibration damper extends between the two end faces 124, 126 of the ring over the interior surface 116 and the plurality of protrusions 128. Together, the plurality of protrusions 128 and the trapezoidal cross-section configuration of the ring secure the vibration damper to the interior surface 116 of the ring preventing circumferential movement of the damper relative to the ring and preventing axial movement of the damper relative to the ring.

A center positioning flange 108 of the plurality of flanges extends radially outwardly from the ring exterior surface 114 at the bottom of the ring. As seen in FIG. 7, the center flange 108 is positioned adjacent the first end face 124 of the ring and has an outer surface 130 that is in the same plane as the ring first end face 124. The opposite side of the center flange 108 is formed with a tapered surface 132 adjacent the distal end of the flange and a flat surface 134 adjacent the connection of the flange to the ring.

A pair of side positioning flanges 112 of the plurality of flanges project radially outwardly from the ring exterior surface 114. As seen in FIG. 7 the pair of side positioning flanges 112 extend from the ring adjacent the second end surface 126 of the ring. Each side positioning flange has a flat surface 136 that opposes the center flange flat surface 134 and the pair of arms 106. Each side flange extends radially from the ring to outer edges 138 of each of the flanges positioned slightly outside of the circumference of the ring exterior surface 114 as seen in FIG. 6. The center flange flat surface 134 and the side flange flat surfaces 136 are spaced axially from each other forming a gap 142 between the flanges at the bottom of the ring exterior surface. As seen in FIG. 7, the gap 142 is dimensioned sufficiently wide to receive the width of the support bracket 114 with the support surface 28 of the bracket engaging the exterior surface 114 of the hub ring and with a first side surface 144 of the bracket engaging against the center flange flat surface 134 and a second side surface 146 of the bracket engaging against the flat surfaces 136 of the side positioning flanges 112.

The pair of resilient, flexible arms 106 project radially outwardly from the ring exterior surface 114 adjacent the first end face 124 of the ring. As seen in FIG. 6, the arms are positioned on the ring exterior surface slightly above the pair of side positioning flanges 112. The arms make up a part of the locking mechanism of the hub ring. The resilient flexibility of the arms enables them to flex axially between first and second positions of the arms relative to the hub ring. In FIGS. 5 through 8 the arms are shown in their first, at rest positions relative to the ring 104. When the arms are moved to their second positions relative to the ring they flex or bend axially away from the pair of side positioning flanges 112. Each arm projects radially from the ring exterior surface 114 to a distal end of the arm and each arm has a wedge shaped barb 152 at its distal end. Each barb 152 has a tapered surface 154 that faces toward the pair of side positioning flanges 112. The tapered surfaces 154 of the barbs slid along the first surface 144 of the bracket when the hub ring 12 is being positioned on the support surface 28 of the bracket causing the resilient arms to resiliently flex from their first, at rest positions of the arms relative to the annular ring 104 to their second, axially displaced positions of the arms relative to the ring. Each barb also has a locking surface 156 that is angled relative to its tapered surface 154. Each locking surface 156 is positioned on the arm to pass over and engage against the latch surface 34 of each support bracket arm catch 32 when the hub ring is being positioned on the support surface 28 of the bracket. Each arm of the locking mechanisms is also provided with a rib 158 that extends across a surface of the arm from the ring exterior surface 114 to the barb 152 of the arm. The rib 158 functions in reinforcing the arm and also functions as an axial spacer as will be explained.

In attaching the hub ring 76 of the invention to the support bracket 14 of the prior art, the hub ring is first positioned manually above the support bracket with the gap 142 between the center flange 108 and side positioning flanges 112 positioned directly above the support surface 28 of the bracket. The hub ring is then moved downwardly toward the support surface. As the hub ring is moved downwardly the outer edges 138 of the side positioning flanges 112 will first come into contact with and slide over the bracket second surface 146 due to their being positioned slightly outside of the circumference of the ring exterior surface 114. As the hub ring is continued to be moved downwardly the tapered surfaces 154 of the pair of barbs 152 will next come into engagement with the support bracket 14 sliding over the first surface 144 of the bracket. If the hub ring 76 is held manually with its center axis 122 parallel to the support bracket support surface 28 and with its center axis 122 perpendicular with the bracket first 144 and second 146 surfaces, the tapered surfaces 154 of the barbs will cause the resilient arms 106 to flex relative to the annular ring 104 from their first positions to their second positions as the tapered surfaces 154 pass over the bracket first surface 144. However, it may be difficult for the installer to continue to hold the hub ring 76 in its orientation with its center axis 122 parallel to the bracket support surface 28 and the hub ring may rotate slightly in a clockwise rotation relative to the support bracket 14 as viewed in FIG. 7. The slight rotation of the hub ring will be corrected though as the hub ring 76 is continued to be moved downwardly toward the bracket support surface 28 and the tapered surface 132 of the center flange 108 comes into contact with the first surface 144 of the bracket adjacent the bottom of the bracket support surface 28. The tapered surface 132 of the center flange will move the hub ring 76 to the orientation relative to the support bracket 14 shown in FIG. 7 as the tapered surface passes over the bracket first surface 144. As the hub ring is continued to be moved downwardly the exterior surface 114 of the ring will eventually seat on the support surface 28 of the support bracket and the locking surfaces 156 of the barbs 152 will pass over the latch surfaces 34 of the bracket arm catches 32 causing the resilient arms 106 to snap back to their first positions relative to the annular ring 104, thereby automatically locking the hub ring 76 on the support bracket 14. FIG. 7 shows the hub ring 76 locked on the support bracket 14 with the center flange flat surface 134 engaging the bracket first surface 144 and the side flange flat surfaces 136 engaging the bracket second surface 146, with the locking surfaces 156 of the pair of barbs 152 engaging beneath the latch surfaces 34 of the support bracket arm catches 32 and with the pair of ribs 158 engaging against the first surface 144 of the support bracket. The engagement of all of these surfaces of the hub ring 76 with the respective surfaces of the support bracket 14 securely holds the hub ring against movement on the support bracket.

Referring to FIG. 7, it can be seen that the engagement of the resilient arm ribs 158 against the bracket first surface 144 produces a small spacing 162 between the resilient arms 106 and the bracket first surface. The spacing 162 is sufficiently large to enable the insertion of a flat prying tool into the spacing to flex the resilient arms 106 away from the bracket first surface 144. The arms 106 can be flexed away from the bracket first surface to the extent that the locking surfaces 156 of the barbs 152 will pass from beneath the latch surfaces 34 of the bracket arm catches 32 enabling the hub ring 76 to be easily removed from its locked position on the support bracket 14 by pulling the hub ring upwardly. In removing the hub ring one of the barbs 152 is first removed from its engagement with the arm catch latch surface 34 and is then moved upwardly slightly so that the barb engages against the bracket first surface 144 above the latch surface 34, and then the other barb 152 is moved in a similar manner in unlocking the hub ring from the support bracket.

Thus, the integral locking mechanism of the hub ring automatically locks the hub ring on the support bracket when it is properly positioned on the support surface of the support bracket. There is no need for additional attachment parts, fasteners or tools. In addition, the hub ring is easily removed from its attachment to the support bracket by using only a prying tool, for example a small flat tipped screwdriver. The hub ring and its integral locking mechanism are constructed of a rigid but resilient plastic, reducing its manufacturing costs.

While the present invention has been described by reference to a specific embodiment, it should be understood that modifications and variations of the invention may be constructed without departing from the scope of the invention defined in the following claims.

What is claimed:

1. A hub ring for mounting a shaft on a bracket having a support surface, the hub ring comprising:

an annular ring having a center axis;

a locking mechanism secured to the ring, the locking mechanism being adapted for automatically attaching the hub ring to the bracket when the hub ring is positioned on the support surface of the bracket;

the locking mechanism includes at least one resilient arm protruding from the annular ring and a barb on a distal end of the arm, the barb is positioned on the arm where the barb will engage with the bracket and cause the arm to deflect from a first position of the arm relative to the annular ring to a second position of the arm relative to the annular ring when the hub ring is moved in a first direction toward the support surface of the bracket, the arm is adapted for causing the arm to at least partially resiliently return from its second position to its first position relative to the annular ring as the barb passes an edge of the bracket when the hub ring is positioned on the support surface of the bracket, the barb also being positioned on the arm where the barb will engage the edge of the bracket and limit motion of the hub ring relative to the bracket in a second direction, opposite the first direction when the hub ring is positioned on the support surface of the bracket.

2. The hub ring of claim 1, wherein:

the first direction is perpendicular to the center axis of the annular ring.

3. The hub ring of claim 1, wherein:

the barb and the arm are positioned on the annular ring relative to the flange where the barb will engage with a first axial side of the bracket and cause the arm to deflect axially when the hub ring is moved in the first direction toward the support surface of the bracket.

4. The hub ring of claim 3, wherein:

the arm has a rib that is positioned on the arm where it will engage with the first axial side of the bracket and limit axial movement of the hub ring toward the second axial side of the bracket when the hub ring is positioned on the support surface of the bracket.

5. The hub ring of claim 4, wherein:

the rib projects from the arm to provide a spacing between the arm and the first side of the bracket when the hub ring is positioned on the support surface of the bracket, the spacing is dimensioned sufficiently large to allow a prying tool to be inserted into the spacing to deflect the arm and disengage the barb from the edge of the bracket when the hub ring is positioned on the support surface of the bracket, thereby facilitating removal of the hub ring from the bracket.

6. The hub ring of claim 5, further comprising:

a second flange protruding from the annular ring, the second flange is positioned on the annular ring where the flange will engage with the first axial side of the bracket and limit axial movement of the hub ring toward the second axial side of the bracket when the hub ring is positioned on the support surface of the bracket.

7. The hub ring of claim 3, further comprising at least one flange protruding from the annular ring, the flange is positioned on the annular ring where the flange will engage against a second axial side of the bracket and limit axial movement of the hub ring toward the opposite, first axial side of the bracket when the hub ring is positioned on the support surface of the bracket.

8. A hub ring for supporting a shaft on a bracket, the bracket having a support surface for receiving and supporting the hub ring and a latch surface, the hub ring comprising:

an annular ring having an outer peripheral surface and an inner surface surrounding a center opening of the ring, the center opening having a center axis;

a locking mechanism positioned on the ring where the locking mechanism will engage against the latch surface of the bracket and thereby automatically lock the ring to the bracket when the ring outer peripheral surface is positioned on the support surface of the bracket; and the outer peripheral surface of the annular ring extends axially between opposite first and second end faces of the ring and the locking mechanism is positioned adjacent the first end face of the ring and is axially spaced from the second end face of the ring.

9. The hub ring of claim 8, wherein:

a flange projects from the ring and is positioned on the ring adjacent the second end face of the ring and is axially spaced from the first end face of the ring and the locking mechanism.

10. The hub ring of claim 8, wherein:

the locking mechanism is one of a pair of locking mechanisms that are positioned adjacent the first end face of the ring and are axially spaced from the second end face of the ring.

11. A hub ring for supporting a shaft on a bracket, the bracket having a support surface for receiving and supporting the hub ring and a latch surface, the hub ring comprising:

an annular ring having an outer peripheral surface and an inner surface surrounding a center opening of the ring, the center opening having a center axis;

a locking mechanism positioned on the ring where the locking mechanism will engage against the latch surface of the bracket and thereby automatically lock the ring to the bracket when the ring outer peripheral surface is positioned on the support surface of the bracket;

the locking mechanism includes an arm that projects from the ring and is resiliently flexible between first and second positions of the arm relative to the ring, the arm is positioned on the ring where the arm will engage against a portion of the bracket and resiliently flex from its first position when the ring outer peripheral surface is moved in a direction generally perpendicular to the ring center axis toward the bracket support surface, and where the arm will resiliently flex from its second position back to its first position and engage against the bracket latch surface when the ring outer peripheral surface is positioned on the bracket support surface.

12. The hub ring of claim 11, wherein:

the annular ring and locking mechanism are one monolithic piece.

13. The hub ring of claim 11, wherein:

the arm projects from the ring to a distal end of the arm, the arm has a barb on the distal end an the barb engages against the bracket latch surface when the ring outer peripheral surface is positioned on the bracket support surface.

14. The hub ring of claim 13, wherein:

the arm is one of a pair of like arms that project from the ring.

15. The hub ring of claim 14, wherein:

a pair of flanges project from the ring and are positioned on the ring where the pair of flanges are axially spaced from the pair of arms defining a gap between the pair of flanges and the pair of arms, and the gap is dimensioned to receive the bracket therein when the ring out peripheral surface is positioned on the bracket support surface.

16. The hub ring of claim 11, wherein:

a flange projects from the ring and its positioned on the ring where the flange is axially spaced from the arm defining a gap between the flange and arm, and the gap is dimensioned to receive the bracket therein when the ring outer peripheral surface is positioned on the bracket support surface.

17. The hub ring of claim 11, wherein:

a pair of flanges project from the ring and are positioned on the ring adjacent the second end face of the ring and are axially spaced from the first end face of the ring and the pair of locking mechanisms.

* * * * *